US010843640B2

(12) United States Patent
Marchlewski et al.

(10) Patent No.: US 10,843,640 B2
(45) Date of Patent: Nov. 24, 2020

(54) VEHICLE WITH LOCATOR DEVICE CONFIGURED TO MAINTAIN OUTER BODY PANEL ALIGNMENT, AND CORRESPONDING METHOD

(71) Applicant: Ford Global Technologies, LLC, Dearborn, MI (US)

(72) Inventors: Jack Marchlewski, Saline, MI (US); Darrin Neil Wagner, Bloomfield Hills, MI (US); Robert Reiners, Grosse Ile, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 173 days.

(21) Appl. No.: 16/219,997

(22) Filed: Dec. 14, 2018

(65) Prior Publication Data

US 2020/0189491 A1 Jun. 18, 2020

(51) Int. Cl.

*B60R 13/04* (2006.01)
*F16B 5/06* (2006.01)
*F16B 5/12* (2006.01)

(52) U.S. Cl.

CPC .............. *B60R 13/04* (2013.01); *F16B 5/065* (2013.01); *F16B 5/123* (2013.01)

(58) Field of Classification Search

CPC .......... B60R 13/04; F16B 5/065; F16B 5/123; F16B 5/0628; B62D 25/02; B62D 25/06; B62D 865/02; B62D 865/02406; B62D 865/16; B62D 25/08; B62D 65/02; B62D 65/02406; B62D 65/16

See application file for complete search history.

(56) References Cited

U.S. PATENT DOCUMENTS 3,488,792 A * 1/1970 Bartz ........................ E05D 3/12 16/86.1
4,186,645 A 2/1980 Zaydel
5,029,364 A * 7/1991 Salazar .................. B60J 5/0431 16/382
5,269,640 A * 12/1993 Jonishi .................. F16B 37/043 411/182

(Continued)

FOREIGN PATENT DOCUMENTS

CN 204567545 U 8/2015
EP 1937538 B1 5/2016

OTHER PUBLICATIONS

Eastwood Pin Alignment System, Downloaded from http://www.eastwood.com/eastwood-pin-alignment-system.html, Oct. 31, 2018.

(Continued)

*Primary Examiner* — Gregory A Blankenship
(74) *Attorney, Agent, or Firm* — David Choppiellie; Carlson, Gaskey & Olds, P.C.

(57) ABSTRACT

This disclosure relates to a motor vehicle with a locator device configured to maintain outer body panel alignment, and a corresponding method. In particular, an example method includes temporarily attaching a locator device to one of a body of a motor vehicle and an outer body panel connectable to the body. The method further includes connecting the outer body panel to the body, and rigidly connecting the locator device to the other of the body and the outer body panel.

17 Claims, 9 Drawing Sheets

10 28 64 64 36 64 36 64 36 36 32 12 64 36 30 38 36 36 38 36

(56) References Cited

U.S. PATENT DOCUMENTS

| | | | | |
|---|---|---|---|---|
| 5,446,957 | A * | 9/1995 | Wu | B62D 25/24 29/423 |
| 5,531,496 | A * | 7/1996 | Zbinden | B60J 1/005 296/201 |
| 5,644,817 | A | 7/1997 | Bender et al. | |
| 5,950,295 | A * | 9/1999 | Worden | B62D 65/06 118/500 |
| 6,209,946 | B1 * | 4/2001 | Eng | B62D 25/04 296/146.15 |
| 6,669,274 | B2 * | 12/2003 | Barnard | B60R 19/52 296/193.1 |
| 8,297,817 | B2 * | 10/2012 | Hashimoto | B60Q 1/2649 362/546 |
| 8,322,110 | B2 * | 12/2012 | Chou | B60R 13/04 52/716.5 |
| 8,516,770 | B2 * | 8/2013 | Bissinger | B60J 1/006 52/716.6 |
| 9,771,108 | B2 * | 9/2017 | Donabedian | B60R 13/04 |
| 9,862,422 | B2 * | 1/2018 | Jarvis | B62D 25/025 |
| 2003/0102693 | A1 * | 6/2003 | Lydan | B60R 13/04 296/191 |
| 2004/0264203 | A1 * | 12/2004 | Konno | B60Q 1/0475 362/465 |
| 2007/0040404 | A1 * | 2/2007 | Williams | B60R 13/0206 296/39.1 |
| 2007/0138835 | A1 * | 6/2007 | Kapadia | B62D 25/084 296/193.09 |
| 2007/0183864 | A1 * | 8/2007 | Shishikura | F16B 5/025 411/323 |
| 2009/0008818 | A1 * | 1/2009 | Fayt | B60Q 1/0475 264/239 |
| 2009/0309388 | A1 * | 12/2009 | Ellison | B60R 13/04 296/191 |
| 2012/0003034 | A1 * | 1/2012 | Inaba | F16B 5/0657 403/220 |
| 2013/0020822 | A1 * | 1/2013 | Inoue | B60J 5/107 296/1.08 |
| 2015/0298632 | A1 * | 10/2015 | Chiba | B60R 13/04 296/1.08 |
| 2015/0375797 | A1 * | 12/2015 | Morris | F16B 2/22 296/193.05 |
| 2016/0059898 | A1 * | 3/2016 | MacKay | B62D 25/12 403/165 |
| 2017/0197668 | A1 * | 7/2017 | Miyamoto | B62D 29/005 |
| 2019/0283691 | A1 * | 9/2019 | Auerbach | B60R 13/04 |
| 2020/0164923 | A1 * | 5/2020 | Marchlewski | B62D 25/02 |

OTHER PUBLICATIONS

Misumi USA, "Locating Pins and How They Are Used," Downloaded from https://us.misumi-ec.com/maker/misumi/mech/tech/locatingpinshowtheyareused.html, Oct. 31, 2018.

* cited by examiner 10
64
64
36
36
12
28
64
32
64
36
36
30

38
36
36
38
36

34
12

36
36
36
38
36
38

38

36
34

28
38
12

72
70
66
68
74
28
38
12

28
40
38
34
32
12
58

12
66
28
38

12
66
28
38

66
58
74
58
12
38

VEHICLE WITH LOCATOR DEVICE CONFIGURED TO MAINTAIN OUTER BODY PANEL ALIGNMENT, AND CORRESPONDING METHOD

TECHNICAL FIELD

This disclosure relates to a motor vehicle with a locator device configured to maintain outer body panel alignment, and a corresponding method.

BACKGROUND

Vehicles include outer body panels. Users may periodically remove and replace the outer body panels for aesthetic reasons or due to damage, as examples. More particularly, users may choose to replace the outer body panels to provide their vehicle with a more rugged appearance, for example, or to equip their vehicle with outer body panels that are better suited to off-roading.

SUMMARY

A method according to an exemplary aspect of the present disclosure includes, among other things, temporarily attaching a locator device to one of a body of a motor vehicle and an outer body panel connectable to the body, connecting the outer body panel to the body, and rigidly connecting the locator device to the other of the body and the outer body panel.

In a further non-limiting embodiment of the foregoing method, the method includes setting a relative position of the outer body panel relative to the body before the step of rigidly connecting the locator device.

In a further non-limiting embodiment of any of the foregoing methods, the method includes removing the outer body panel from the body such that the locator device remains rigidly connected to the other of the body and the outer body panel.

In a further non-limiting embodiment of any of the foregoing methods, the method includes reattaching the outer body panel to the body using the locator device to maintain the relative position set in the setting step.

In a further non-limiting embodiment of any of the foregoing methods, the rigidly connecting step includes rigidly connecting the locator device to the body.

In a further non-limiting embodiment of any of the foregoing methods, the method includes attaching another outer body panel to the body using the locator nut to maintain the relative position set in the setting step.

In a further non-limiting embodiment of any of the foregoing methods, the locator device includes an outer contour corresponding to a contour of a hole of the one of the body and the outer body panel.

In a further non-limiting embodiment of any of the foregoing methods, the outer contour of the locator device and the contour of the hole are polygonal in shape.

In a further non-limiting embodiment of any of the foregoing methods, the outer contour of the locator device and the contour of the hole are substantially rectangular.

In a further non-limiting embodiment of any of the foregoing methods, the outer contour of the locator device further includes retention tabs projecting from opposite sides of the locator device, and the retention tabs are used in the temporarily attaching step for temporarily attaching the locator device to the one of the body and the outer body panel.

In a further non-limiting embodiment of any of the foregoing methods, a clip is used in the temporarily attaching step to temporarily attach the locator device to the one of the body and the outer body panel.

In a further non-limiting embodiment of any of the foregoing methods, the locator device is a locator nut having a threaded bore and a flange, and the rigidly connecting step includes threading a threaded fastener relative to the locator nut. Further, the threaded fastener includes a shaft with external threads configured to mate with the threaded bore of the locator nut.

In a further non-limiting embodiment of any of the foregoing methods, the outer body panel is a rear quarter panel.

A motor vehicle according to an exemplary aspect of the present disclosure includes, among other things, a body, an outer body panel connectable to the body, and a locator device temporarily attachable to one of the body and the outer body panel and rigidly connectable to the other of the body and the outer body panel.

In a further non-limiting embodiment of the foregoing motor vehicle, the outer body panel is connectable to the body by a plurality of first fasteners, the outer body panel includes a plurality of first holes, and the first fasteners include shafts extending through respective ones of the first holes.

In a further non-limiting embodiment of any of the foregoing motor vehicles, the first holes have a dimension greater than the shafts of the first fasteners.

In a further non-limiting embodiment of any of the foregoing motor vehicles, the locator device includes an outer contour corresponding to a contour of a second hole of the one of the body and the outer body panel.

In a further non-limiting embodiment of any of the foregoing motor vehicles, the locator device includes retention tabs projecting from opposite sides thereof, and the retention tabs configured to temporarily attach the locator device to the one of the body and the outer body panel.

In a further non-limiting embodiment of any of the foregoing motor vehicles, the locator device is a locator nut including a threaded bore, a second fastener includes external threads mating with the threaded bore to rigidly connect the locator nut to the other of the body and the outer body panel and to detach the locator nut from the one of the body and the outer body panel.

In a further non-limiting embodiment of any of the foregoing motor vehicles, the outer body panel is a rear quarter panel.

BRIEF DESCRIPTION OF THE DRAWINGS

In FIG. 8, the locator device includes retention tabs configured to temporarily attach the locator device to the outer body panel.

In FIG. 9, a clip is configured to temporarily attach the locator device to the outer body panel.

In FIG. 10, the locator device is temporarily attached to the outer body panel.

FIG. 11 is representative of a condition in which the outer body panel is aligned relative to the body and a fastener is arranged adjacent the locator device.

In FIG. 12, the fastener is engaged with the locator device such that the locator device is rigidly connected to the body.

In FIG. 14, two locator devices are temporarily attached to the body.

In FIG. 16, the locator device is between the outer body panel and the body.

In FIG. 17, the locator device is temporarily attached to the body and a fastener is being inserted into the locator device through a hole in the body.

In FIG. 18, the fastener is inserted further into the locator device than in FIG. 17 and begins applying a pulling force onto the locator device.

In FIG. 19, a pulling force from the fastener has overcome the temporary attachment of the locator device to the body such that the locator device is rigidly connected to the outer body panel.

DETAILED DESCRIPTION

This disclosure relates to a motor vehicle with a locator device configured to maintain outer body panel alignment, and a corresponding method. In particular, an example method includes temporarily attaching a locator device to one of a body of a motor vehicle and an outer body panel connectable to the body. The method further includes connecting the outer body panel to the body, and rigidly connecting the locator device to the other of the body and the outer body panel. In this way, the outer body panel may be removed and reattached to the body, and the locator device will maintain the original position of the outer body panel. These and other benefits will be appreciated from the following description.

Figure 1:
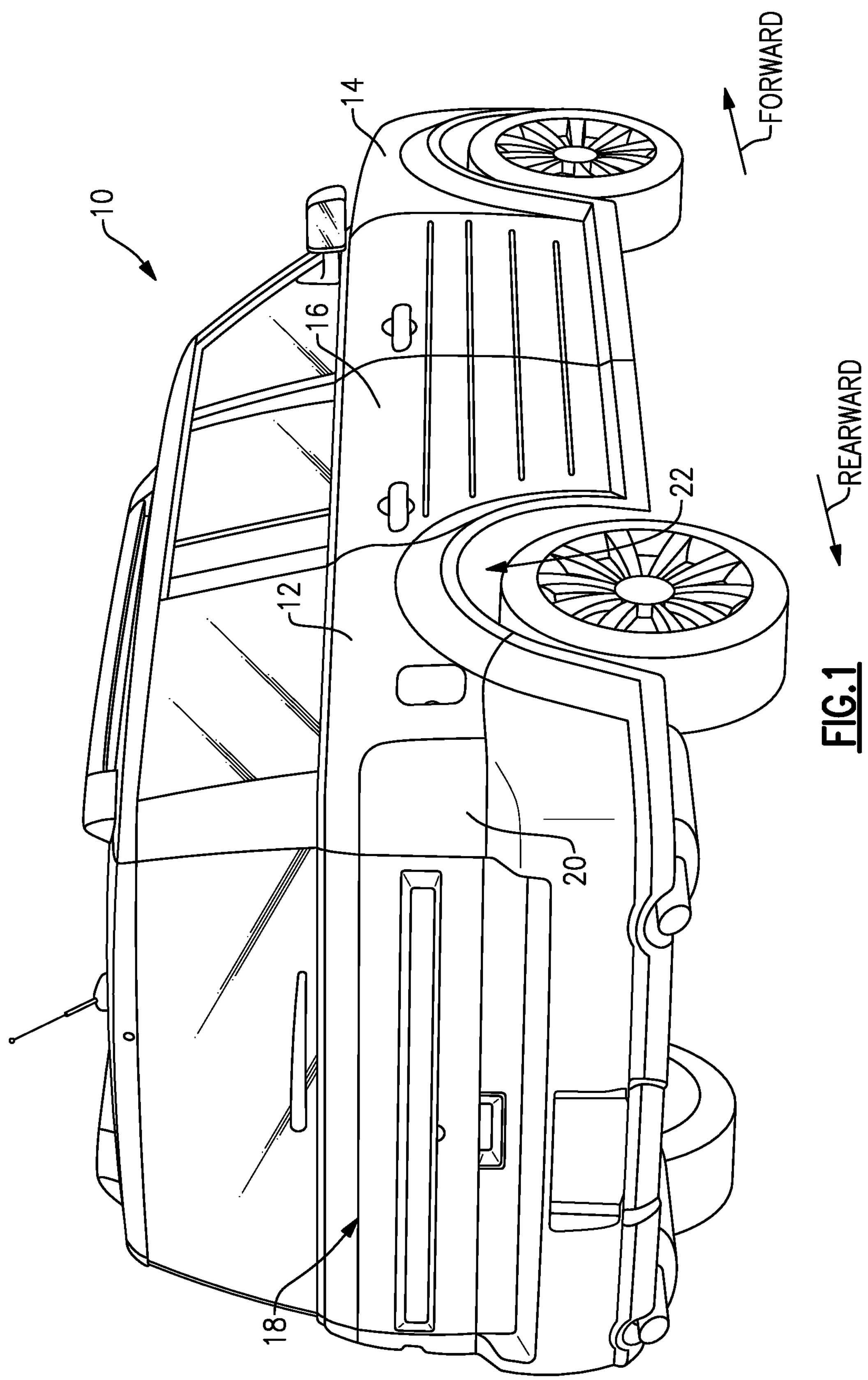
FIG. 1 is a rear perspective view of a motor vehicle.

Referring to the drawings, FIG. 1 is a rear-perspective view of a motor vehicle 10. As shown, the vehicle 10 is a sport utility vehicle (SUV). While an SUV is pictured, this disclosure is also applicable to other types of vehicles, such as vans and trucks (including pickup trucks).

The vehicle 10 includes a plurality of outer body panels 12, 14. The outer body panel 12 is a rear quarter panel of the vehicle 10, and is arranged between a rear door 16 and the rear liftgate 18 of the vehicle 10. The outer body panel 12 is also arranged adjacent a tail lamp 20 and a wheel well 22, and is contoured to correspond to the shapes of both the tail lamp 20 and the wheel well 22. The outer body panel 14 is a front fender of the vehicle 10. The outer body panels 12, 14 may be made of one or more of metal, fiberglass, carbon fiber, fiber-reinforced plastic, as examples. While these two particular outer body panels are shown, this disclosure extends to other types of outer body panels. Further, while only one of each type of outer body panel 12, 14 is shown in FIG. 1, it should be understood that the vehicle 10 includes two of each type of outer body panel, with one of each type of panel being arranged on generally opposite sides of the vehicle 10.

In this disclosure, at least the outer body panel 12 is configured to be selectively attached and removed (i.e., detached) from a body of the vehicle 10. In particular, the outer body panel 12 is configured to be selectively attached and removed from a frame of the vehicle 10. In this way, the outer body panel 12 may be referred to as "modular." The modularity of the outer body panel 12 permits a user to readily replace the outer body panel 12 for aesthetic reasons or if it becomes damaged. In particular, the modularity of the outer body panel 12 permits a user to replace a standard outer body panel with a more robust outer body panel, which may be an aftermarket part or purchased as an accessory through an original equipment manufacturer (OEM), thereby providing the vehicle 10 with a more rugged appearance, for example, or to equip their vehicle with outer panels that are better suited to off-roading.

In general, the manner in which the outer body panel 12 is mounted to the frame of the vehicle 10 is tightly controlled for precision so that the outer surface of the vehicle 10 appears flush. If not properly mounted, safety and quality concerns may arise. In one known assembly process, a rear quarter panel is one of the first panels mounted to a vehicle frame, and subsequently mounted panels, doors, bumpers, fascia, etc., are mounted relative to the rear quarter panel, which underscores the need to properly align the outer body panel 12. In other words, if the outer body panel 12 is misaligned, many other structures may also be misaligned.

In this disclosure, once a relative position of the outer body panel 12 and the body of the vehicle 10 is set, a locator device is used to preserve that relative position such that the outer body panel 12 can be removed and reattached without changing the originally-set relative position. The locator device may also be used to preserve the relative position for purposes of mounting another, different outer body panel 12 to the body. Example locator devices and their uses will be discussed below.

Figure 2:
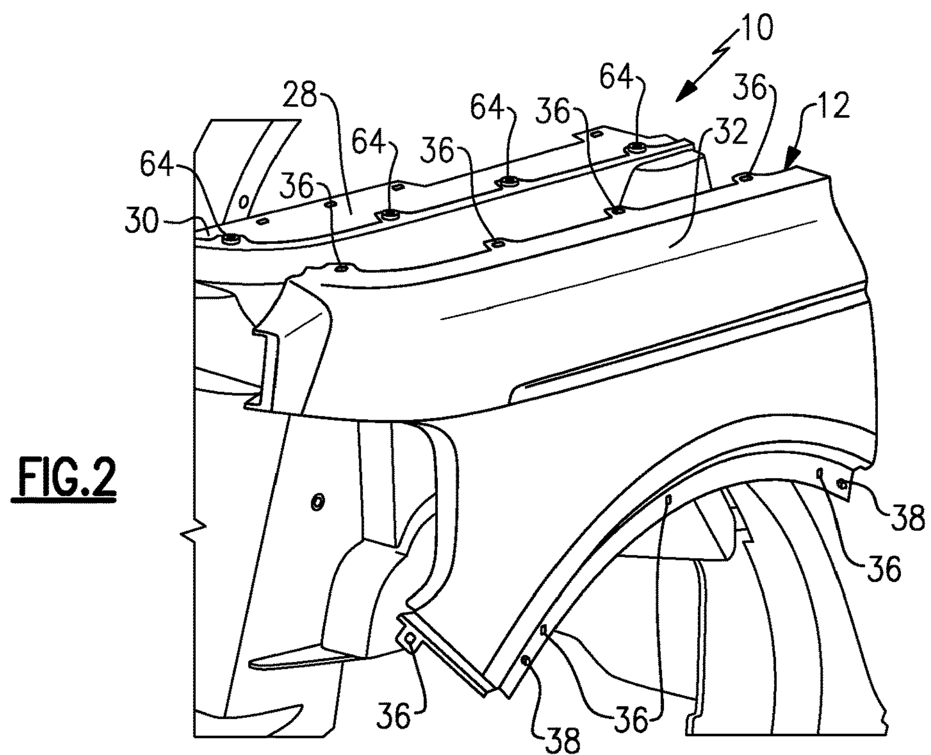
FIG. 2 is a perspective view of an outer surface of an outer body panel. The outer body panel is adjacent a section of the body of the motor vehicle of FIG. 1.

With reference to FIG. 2, the vehicle 10 includes a body 28, which includes the vehicle frame, and in particular includes the D-pillar 30, which is a substantially vertical support near the rear of the vehicle 10. Further, in FIG. 2, the outer body panel 12 has not yet been attached to the body 28.

Figure 3:
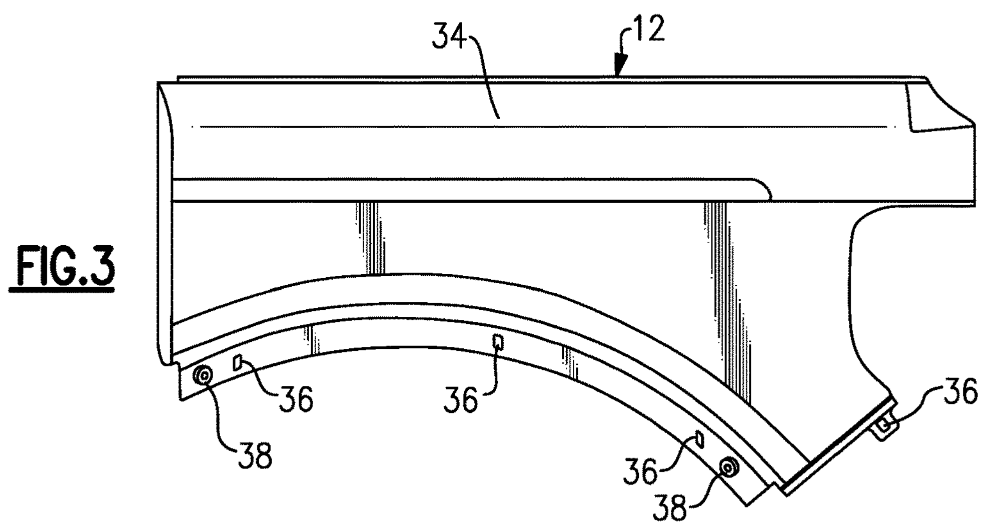
FIG. 3 is a view of the inner surface of the outer body panel of FIG. 2.

An outer surface 32 of the outer body panel 12 is visible in FIG. 2, and an inner surface 34 of the outer body panel 12 is visible in FIG. 3.

The outer body panel 12 includes a plurality of holes 36 arranged generally about a perimeter of the outer body panel 12. Most of the holes 36 receive fasteners configured to attach the outer body panel 12 to the body 28. Another number of the holes 36 are configured to receive locator devices 38, which maintain a relative position between the outer body panel 12 and the body 28.

In this example, two locator devices 38 are arranged within two of the holes 36. While two locator devices 38 are illustrated in FIGS. 2 and 3, it should be understood that this disclosure is not limited to arrangements with two locator devices, and extends to arrangements including one or more locator devices.

Figure 4:
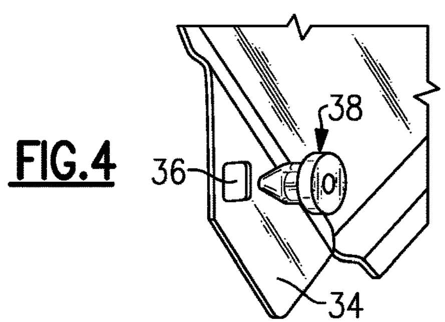
FIG. 4 is a close-up view of an example locator device. The locator device is arranged relative to a hole in the outer body panel.

FIG. 4 is a close-up perspective view of the arrangement between one of the locator devices 38 and the outer body panel 12, and specifically one of the holes 36. In this example, the locator device 38 is spaced-apart from the hole 36 in a direction inward of the inner surface 34 of the outer body panel 12.

Figure 5:
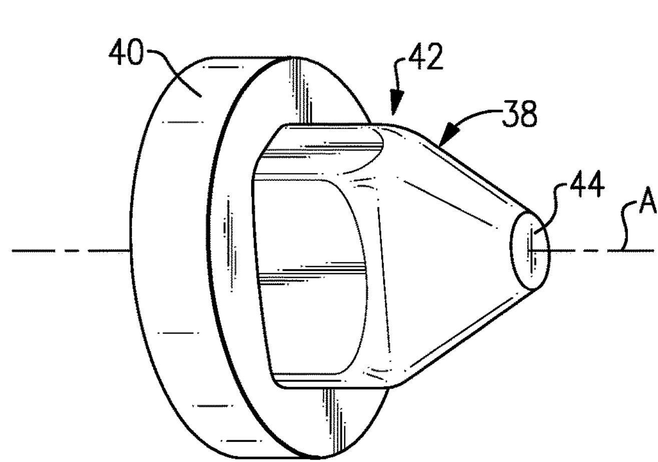
FIG. 5 is a side-perspective view of the locator device.
Figure 6:
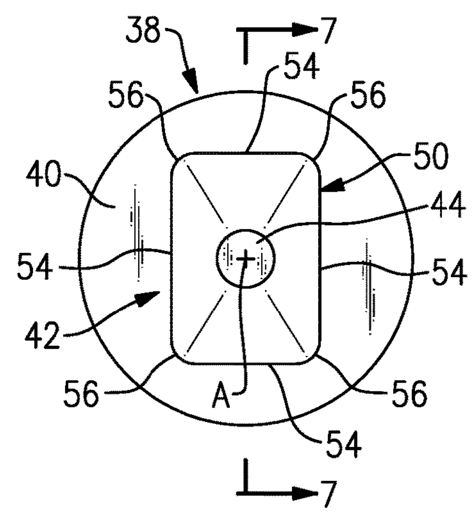
FIG. 6 is an end view of the locator device.
Figure 7:
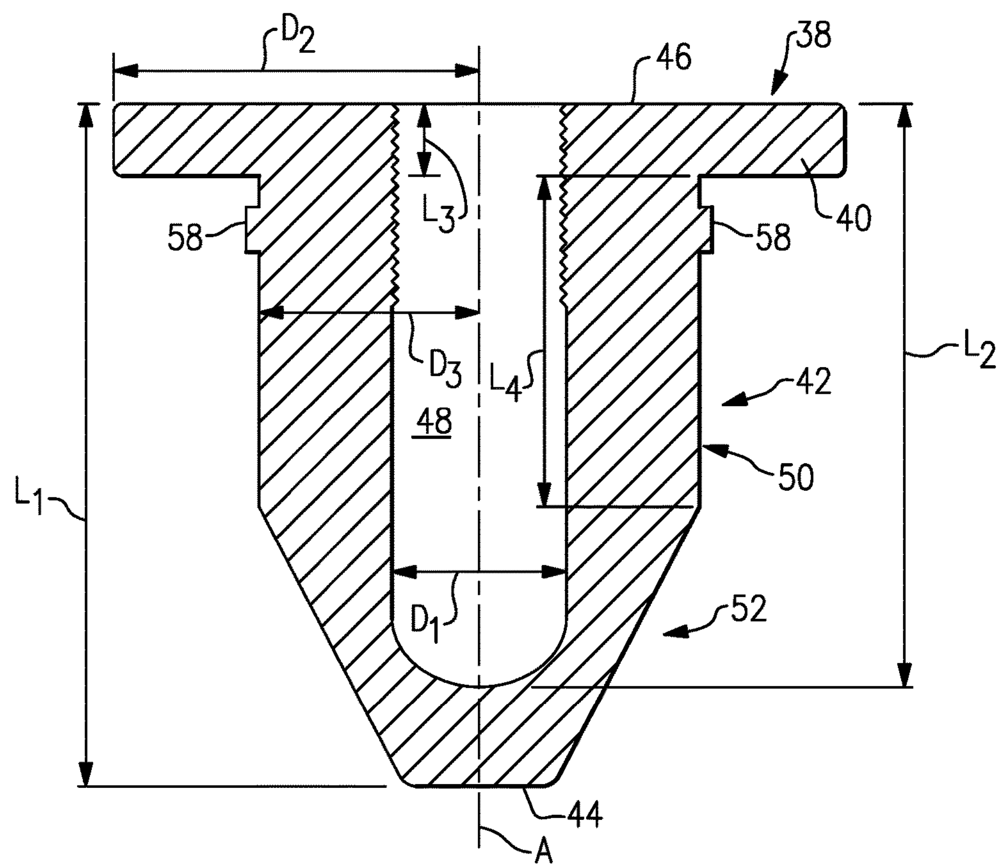
FIG. 7 is a cross-sectional view of the locator device taken along line 7-7 from FIG. 6.

FIGS. 5-7 illustrate the detail of an example locator device 38. FIG. 5 is a side perspective view of the example locator device 38. In general, the locator device 38 is substantially symmetrical and is arranged about an axis A. At one end, the locator device 38 includes a flange 40, which is substantially circular and is centered about the axis A. The locator device 38 also includes projection 42 which projects from the flange 40 and terminates at a nose 44, which is at an opposite end of the locator device 38 as the flange 40.

FIG. 6 is an end view of the locator device 38, as viewed down the nose 44, and FIG. 7 is a cross-sectional view of the locator device taken along line 7-7 from FIG. 6. With reference to both FIGS. 6 and 7, further detail the example locator device 38 will now be provided. Again, in general, the locator device 38 includes the flange 40 and the projection 42. Overall, the locator device 38 has a length $L_1$ extending between the nose 44 and an end 46 of the locator device adjacent the flange 40.

The locator device 38 further includes a central bore 48 centered around the axis A and exhibiting a diameter $D_1$. The central bore 48 extends a length $L_2$, which is less than $L_1$, from the end 46 such that the central bore 48 ends at a location spaced-apart from the nose 44. In this way, the central bore 48 is not a through-hole. A section of the central bore 48 may be threaded. In one particular example, a section of the central bore 48 adjacent the end 46 is threaded and is configured to mate with threads of a fastener, as discussed below. In this way, the locator device 38 may be referred to as a locating nut.

With continued reference to FIGS. 6 and 7, the flange 40 exhibits an outer diameter $D_2$ and extends a length $L_3$ from the end 46. Continuing down the locator device 38, relative to FIG. 7, the locator device 38 necks down between the flange 40 to the projection 42. In particular, the projection 42 includes a first section 50 exhibiting an outer diameter $D_3$ less than $D_2$ and extending a length $L_4$ from the flange 40.

The outer contour of the first section 50 is perhaps best seen in FIG. 6. In particular, the outer contour includes a plurality of substantially flat wall sections 54 connected together by rounded corners 56. The wall sections 54 and rounded corners 56 are arranged such that the outer contour of the first section 50 is substantially rectangular in one example. In another example, the outer contour substantially resembles a "squircle" shape. The outer contour of the first section 50 could be selected to correspond to another shape, such as other polygonal shapes, however. Further, the outer contour of the first section 50 substantially matches a contour of the holes 36 such that, when the locator device 38 is arranged in a hole 36, the locator device 38 fits relatively snug within the hole 36 such that rotation of the locator device 38 is prevented.

The second section 52 extends between the first section 50 and the nose 44 and is substantially frustoconical in one example. The second section 52 exhibits the diameter $D_3$ adjacent the first section 50, and tapers such that the diameter of the second section 52 gradually reduces approaching the nose 44.

In this disclosure, the locator device 38 is temporarily attachable to one of the body 28 and the outer body panel 12, and is then essentially transferred and rigidly connected to the other of the body 28 and the outer body panel 12. In this way, the locator device 38 does not interfere with one's ability to align the outer body panel 12 relative to the body 28 and set a relative position of the two. In particular, the locator device 38 allows one to align the outer body panel 12 while it is held up against the body 28, in situ, which increases mounting precision. Once the relative position is set, the locator device 38 is configured to maintain that position.

Figure 8:
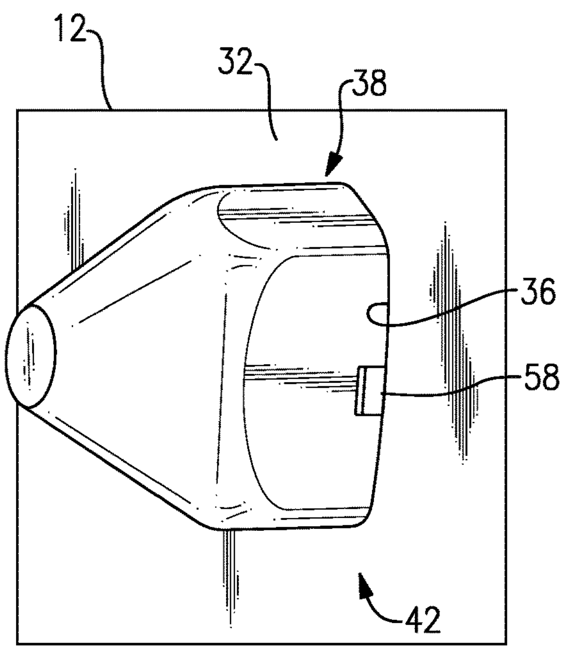
FIG. 8 is a view of the locator device arranged in a hole of the outer body panel.
Figure 9:
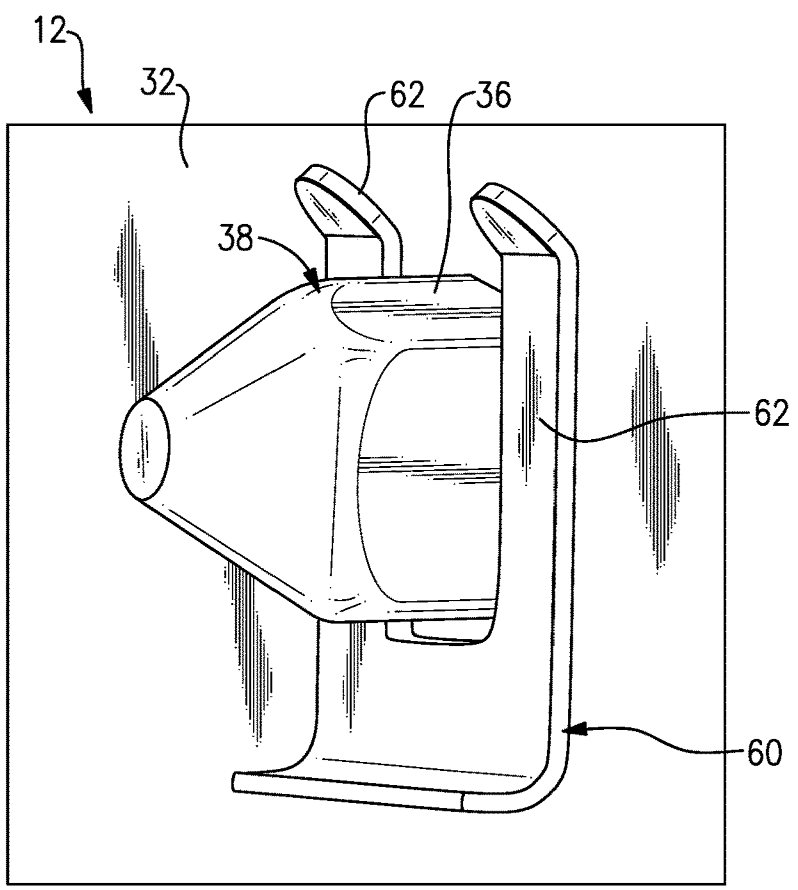
FIG. 9 is also a view of the locator device arranged in a hole of the outer body panel.
Figure 10:
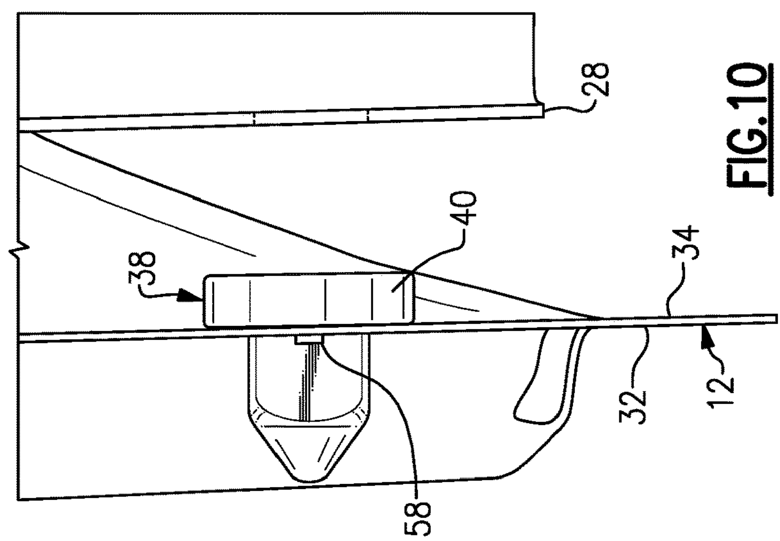
FIG. 10 is a side view illustrating an example arrangement of the locator device, outer body panel, and body.

In one example, the locator device 38 is first temporarily attached to the outer body panel 12, and is then transferred and rigidly connected to the body 28. The locator device 38 may be temporarily attached to the outer body panel 12 in multiple ways, two of which are shown in FIGS. 8 and 9. With reference to FIG. 8, the locator device 38 may include two retention tabs 58 projecting from opposite sides thereof. In particular, with reference to FIG. 7, the retention tabs 58 may project outward from the first section 50 beyond the outer diameter $D_3$. In FIG. 8, the locator device 38 has been inserted into the hole 36 from a side of the inner surface 34 of the outer body panel 12, and a portion of the projection 42 projects through the hole 36. The outer body panel 12 fits between the retention tabs 58 and the flange 40, as shown in FIG. 10. The retention tabs 58 may be made of a relatively resilient material which is deflectable upon application of a pulling force, such that the retention tabs 58 provide temporary attachment of the locator device 38.

In an alternate embodiment, the locator device 38 may be temporarily attached to the outer body panel 12 by way of a clip 60, as shown in FIG. 9. The clip 60 is substantially U-shaped, in this example, with arms 62 extending along opposite sides of the locator device 38. The arms 62 are configured to apply a force onto the locator device 38 which provides a temporary attachment to the outer body panel 12. While they are shown separately, the clip 60 may be used in combination with the retention tabs 58, in some examples. Further, while only two techniques for temporarily attaching the locator device 38 to the outer body panel 12 are shown, this disclosure extends to other such techniques.

Figure 11:
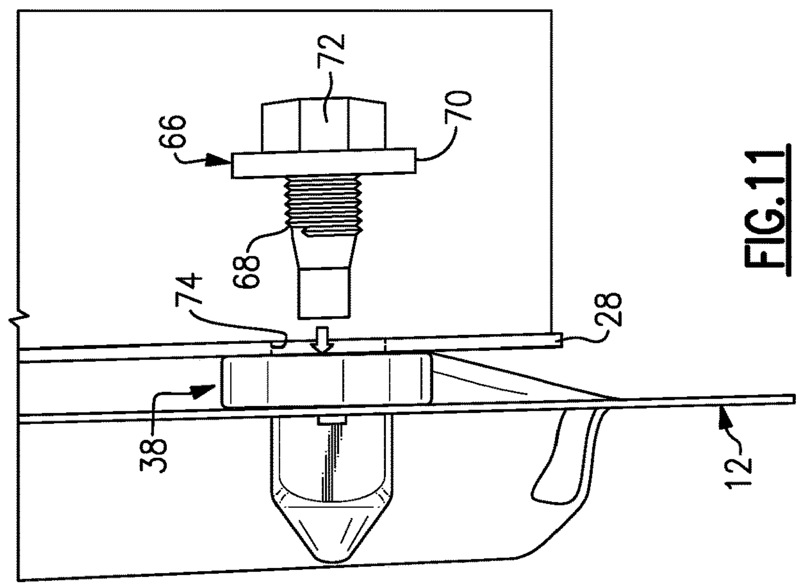
FIG. 11 is a side view illustrating an example arrangement of the locator device, outer body panel, and body. In particular.

FIGS. 10-13 illustrate an example sequence representative of a method of this disclosure. In FIG. 10, the locator device 38 is temporarily attached to the outer body panel 12 using retention tabs 58, as in the example of FIG. 8. The outer body panel 12, along with the locator device 38, are then moved toward the body 28, as shown in FIG. 11.

Before rigidly connecting the locator device 38 to the body 28, a first set of fasteners are passed partially through the holes 36 and threaded into corresponding threaded holes 64 (FIG. 2) in the body 28. While threaded fasteners, such as bolts and screws, are mentioned herein, this disclosure could extend to cams, ties, clasps, clamps, latches, etc. That said, the first set of fasteners may be bolts.

Before fully tightening the first set of fasteners, the relative position of the outer body panel 12 is set relative to the body 28. The first set of fasteners and holes 36 are sized to permit some relative movement, in this example, because the fasteners have a reduced shaft diameter relative to the diameter of the holes 36. This is contrary to the locator device 38, which fits relatively snug within the holes 36, and does not permit relative movement. The relative position of the outer body panel 12 may be set by a worker and/or robot in an assembly setting using one or more tools, such as gauges, calipers, etc. Once the relative position is set and the outer body panel 12 and body 28 are aligned, the first set of fasteners are fully tightened to connect the outer body panel 12 to the body 28.

Figure 12:
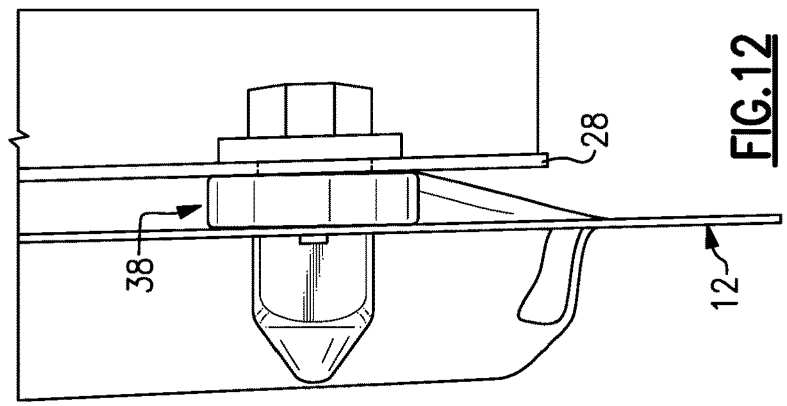
FIG. 12 is a side view illustrating an example arrangement of the locator device, outer body panel, and body.

At this point, another fastener 66 is engaged with the locator device 38. The fastener 66 is a bolt in this example. The first set of fasteners may be the same type of fastener as the fastener 66, in one example. With reference to FIGS. 11 and 12, the fastener 66 includes a shaft 68, a flange 70, and a head 72. The flange 70 may be provided by a separate washer, or may be integral with the shaft 68 and the head 72. The head 72 may be different than that of the first set of fasteners, in one example, to prevent unintended detachment of the locator device 38. The shaft 68 includes external threads, in one example, configured to mate with the threads of the central bore 48.

The shaft 68 of the fastener 66 passes through a hole 74 in the body 28, which is larger than the shaft 68 but smaller than the flange 70. Upon tightening the fastener 66, the locator device 38 becomes rigidly connected to the body 28, as shown in FIG. 12. Due to the relative sizes of the shaft 68 and the hole 74, the locator device 38 is rigidly connected to the body 28 in a unique position depending on the way in which the outer body panel 12 is aligned relative to the body. The fastener 66 holds that unique position, and thus permits a user to remove and reattach the outer body panel 12 or another outer body panel without having to realign the outer body panel and body 28.

Figure 13:
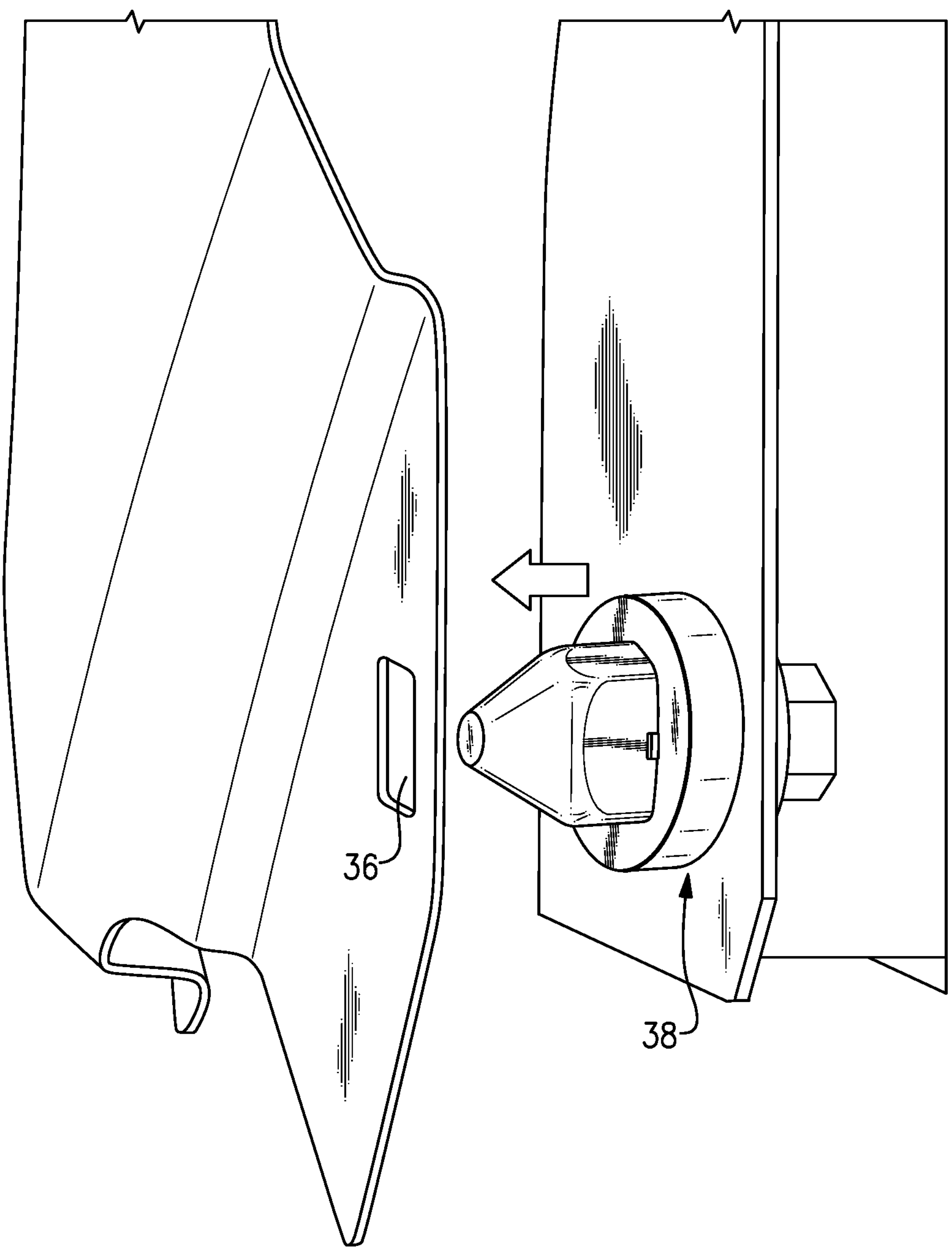
FIG. 13 is a perspective view representative of a condition in which the outer body panel is removed from the body while the locator device remains rigidly connected to the body.

When removing the outer body panel 12 from the body 28, the locator device 38 remains rigidly connected to the outer body panel 12. FIG. 13 is representative of a condition in which the first set of fasteners have been removed from the holes 64. With the fasteners removed, a user may remove the outer body panel 12 from the body 28. If retention tabs 58 are present, the removal force relatively easily overcomes any resistance of the retention tabs 58. If clips 60 were used, the clips 60 would be removed prior to removal of the outer body panel 12. As seen in in FIG. 13, the contour of the hole 36 substantially matches the outer contour of the locator device 38, and specifically matches the outer contour of the first section 50 thereof.

In order to re-mount the outer body panel 12 (or another outer body panel), one slides the outer body panel 12 relative to the body 28 such that the locator device 38 again projects through the hole 36. When doing so, the originally-set relative position of the outer body panel 12 and the body 28 is maintained. Thus, a user may remove and replace the outer body panel 12 without having to realign the outer body panel 12.

As used herein, the term "rigidly connect" refers to non-permanent mechanical joints between two objects. In other words, the fastener 66 and locator device 38 do not create a permanent joint such as those created by welding. Further, the joint is not able to be changed during normal conditions, and is thus "rigid." For instance, the fastener 66 is configured to hold the locator device 38 in a fixed position and, while the fastener 66 could be removed using a tool, the joint created between the fastener 66 and locator device 38 is not able to be changed during normal conditions. The term "rigidly connected" is contrasted with the term "temporarily attached" herein, the latter of which is an attachment between two objects that is not intended to create a long term mechanical joint. The term "temporary attachment" in this disclosure refers to non-permanent mechanical joints that exist during an assembly process, but are not necessary following completion of the assembly process. For instance, during the assembly process, the locator device 38 is temporarily attached to the outer body panel 12 (FIG. 10), but following completion of the assembly process the locator device 38 is rigidly connected to the body 28 (FIGS. 12 and 13), and thus the temporary attachment is no longer necessary.

While in the above-discussed example, the locator device 38 is temporarily attached to the outer body panel 12 and rigidly connected to the body 28, in another example this could essentially be reversed. In particular, in another example method of this disclosure, which will now be described, the locator device 38 is temporarily attached to the body 28 and is rigidly connected to the outer body panel 12.

Figure 14:
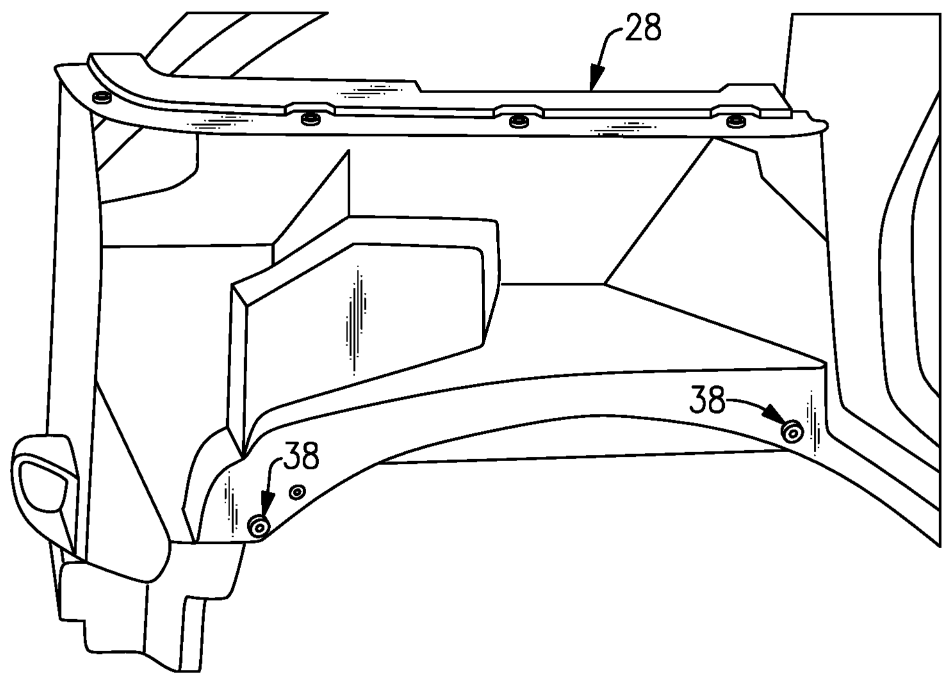
FIG. 14 is a view of a section of the body of the vehicle of FIG. 1.

FIG. 14 illustrates the body 28 with two locator devices 38 temporarily attached thereto. The locator devices 38 are arranged in substantially the same way as those discussed above. While two locator devices 38 are shown, this disclosure extends to arrangements with one or more locator device.

Figure 15:
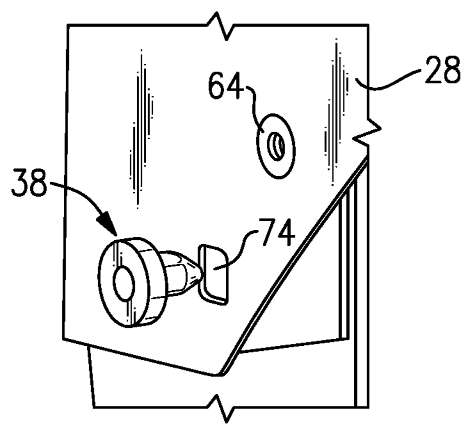
FIG. 15 is a close-up view of the body and one of the locator devices of FIG. 14, with the locator device arranged relative to a hole in the body.

FIG. 15 illustrates the locator device 38 spaced-apart from the body 28. The locator device 38 is configured to fit within a hole 74 in the body 28. The hole 74 exhibits a contour substantially matching that of the outer contour of the first section 50 of the locator device 38. In this way, the locator device 38 fits relatively snug within the hole 74 and is not configured to rotate within the hole 74. The locator device 38 may be temporarily attached to the body 28 using retention tabs 58 and/or clips 60, as discussed above.

Figure 16:
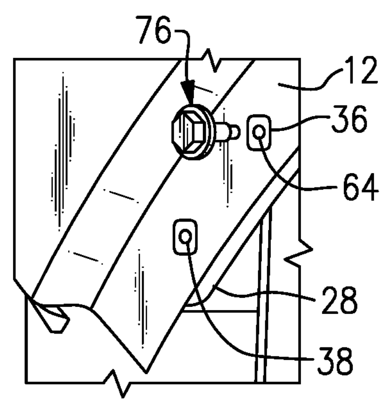
FIG. 16 is a close-up view of an outer body panel arranged relative to the body.

The outer body panel 12 is aligned relative to the body 28 in substantially the same manner discussed above. In general, a first set of fasteners, which may be arranged the same as the fastener 66 of FIG. 11, are passed partially through holes 36 in the outer body panel 12 and are threaded into threaded holes 64 in the body 28. One such fastener 76 is shown in FIG. 16. With the first set of fasteners partially tightened, the outer body panel 12 is aligned relative to the body 28. Once satisfied with the alignment, the first set of fasteners are fully tightened.

Figure 19:
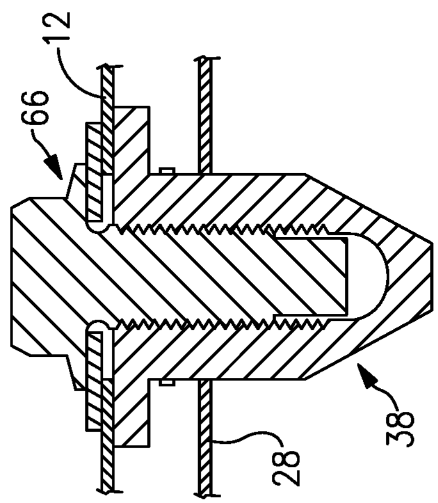
FIG. 19 is a cross-sectional view illustrating an arrangement of the body, locator device, outer body panel, and a fastener.
Figure 18:
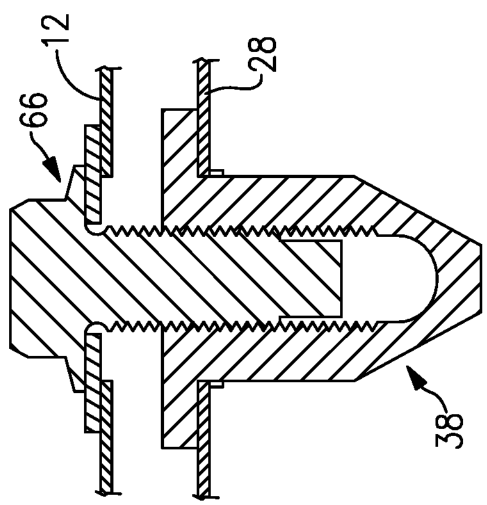
FIG. 18 is a cross-sectional view illustrating an arrangement of the body, locator device, outer body panel, and a fastener.
Figure 17:
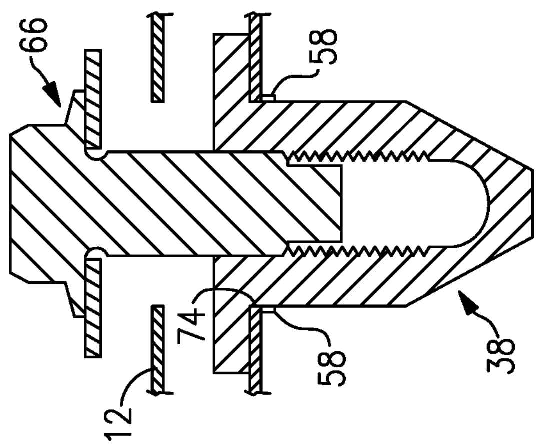
FIG. 17 is a cross-sectional view illustrating an arrangement of the body, locator device, outer body panel, and a fastener.
Figure 20:
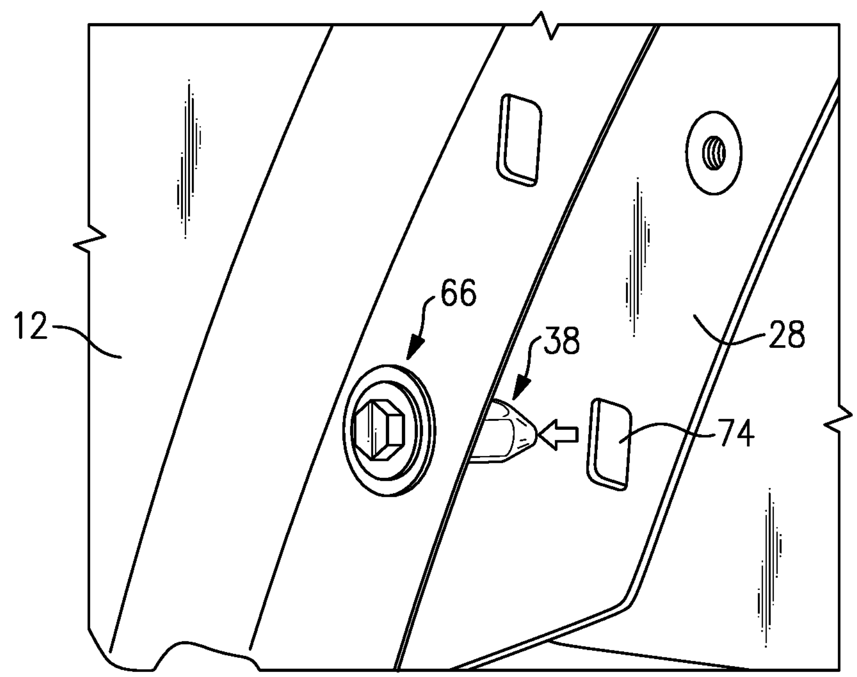
FIG. 20 is a perspective view representative of a condition in which the outer body panel is removed from the body while the locator device remains rigidly connected to the outer body panel.

FIGS. 17-19 illustrate an example sequence representative of the manner in which the locator device 38 becomes rigidly connected to the outer body panel 12. In FIG. 17, the locator device 38 is received in the hole 74 and temporarily attached to the body 28 via retention tabs 58. As the fastener 66 is threaded into the locator device 38, as shown in FIGS. 17 and 18, the fastener 66 imparts a pulling force on the locator device 38 that disengages the retention tabs 58 from the body 28. In particular, locator device 38 is pulled toward the outer body panel 12 such that the retention tabs 58 are no longer in contact with the body 28. Further, the fastener 66 applies sufficient force to hold the locator device 38 against the outer body panel 12, and thereby provide a rigid connection between the locator device 38 and the outer body panel 12, as shown in FIG. 19. With the rigid connection in place, the outer body panel 12 can be removed from the body 28, as shown in FIG. 20, while maintaining the relative position of the locator device 38 on the outer body panel 12. The outer body panel 12 can then be reattached to the body 28 by inserting the locator device 38 back into the hole 74, and thereby maintaining the originally-set alignment between the outer body panel 12 and the body 28.

It should be understood that terms such as "about," "substantially," and "generally" are not intended to be boundaryless terms, and should be interpreted consistent with the way one skilled in the art would interpret those terms. Further, directional terms such as "below," "forward," "rearward," "upward," "downward," "vertical," "horizontal," etc., are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A method, comprising:

temporarily attaching a locator device to one of a body of a motor vehicle and an outer body panel connectable to the body;

connecting the outer body panel to the body; and rigidly connecting the locator device to the other of the body and the outer body panel, wherein the locator device includes an outer contour corresponding to a contour of a hole of the one of the body and the outer body panel, wherein the locator device is a locator nut having a threaded bore and a flange, and wherein the rigidly connecting step includes threading a threaded fastener relative to the locator nut, the threaded fastener including a shaft with external threads configured to mate with the threaded bore of the locator nut.

2. The method as recited in claim 1, further comprising:

setting a relative position of the outer body panel relative to the body before the step of rigidly connecting the locator device.

3. The method as recited in claim 2, further comprising:

removing the outer body panel from the body such that the locator device remains rigidly connected to the other of the body and the outer body panel.

4. The method as recited in claim 3, further comprising:

reattaching the outer body panel to the body using the locator device to maintain the relative position set in the setting step.

5. The method as recited in claim 3, wherein the rigidly connecting step includes rigidly connecting the locator device to the body.

6. The method as recited in claim 5, further comprising:

attaching another outer body panel to the body using the locator nut to maintain the relative position set in the setting step.

7. The method as recited in claim 1, wherein the outer contour of the locator device and the contour of the hole are polygonal in shape.

8. The method as recited in claim 7, wherein the outer contour of the locator device and the contour of the hole are substantially rectangular.

9. The method as recited in claim 7, wherein:

the outer contour of the locator device further includes retention tabs projecting from opposite sides of the locator device, and the retention tabs are used in the temporarily attaching step for temporarily attaching the locator device to the one of the body and the outer body panel.

10. The method as recited in claim 7, wherein a clip is used in the temporarily attaching step to temporarily attach the locator device to the one of the body and the outer body panel.

11. A method, comprising:

temporarily attaching a locator device to one of a body of a motor vehicle and an outer body panel connectable to the body;

connecting the outer body panel to the body; and rigidly connecting the locator device to the other of the body and the outer body panel, wherein the outer body panel is a rear quarter panel.

12. A motor vehicle, comprising:

a body;

an outer body panel connectable to the body; and a locator device temporarily attachable to one of the body and the outer body panel and rigidly connectable to the other of the body and the outer body panel, wherein the outer body panel is a rear quarter panel.

13. The motor vehicle as recited in claim 12, wherein:

the outer body panel is connectable to the body by a plurality of first fasteners, the outer body panel includes a plurality of first holes, and the first fasteners include shafts extending through respective ones of the first holes.

14. The motor vehicle as recited in claim 13, wherein the first holes have a dimension greater than the shafts of the first fasteners.

15. The motor vehicle as recited in claim 13, wherein the locator device includes an outer contour corresponding to a contour of a second hole of the one of the body and the outer body panel.

16. The motor vehicle as recited in claim 15, wherein:

the locator device includes retention tabs projecting from opposite sides thereof, and the retention tabs configured to temporarily attach the locator device to the one of the body and the outer body panel.

17. The motor vehicle as recited in claim 16, wherein:

the locator device is a locator nut including a threaded bore, a second fastener includes external threads mating with the threaded bore to rigidly connect the locator nut to the other of the body and the outer body panel and to detach the locator nut from the one of the body and the outer body panel.

* * * * *